UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

INSULATING COMPOSITION AND PROCESS OF MAKING THE SAME.

1,049,005.  Specification of Letters Patent.  Patented Dec. 31, 1912.

No Drawing.  Application filed July 29, 1911. Serial No. 641,220.

*To all whom it may concern:*

Be it known that I, CHARLES P. STEINMETZ, a citizen of the United States, residing at Schenectady, county of Schenectady, State of New York, have invented certain new and useful Improvements in Insulating Compositions and the Process of Making the Same, of which the following is a specification.

My invention relates to compositions suitable for electrical insulation, especially where it is important that the composition shall be heat resistive.

The object of my invention is to provide a cheap and efficient material which can be readily molded and machined into desired form. In accordance with said invention a refractory earthy compound such as talc, silica, alumina and the like is mixed in powdered form with a binder consisting of a gelatinous compound of substantially the same composition. The mixture is shaped into desired form, as by molding or squirting, and is finally fired.

As an example of my invention, I will describe the production of an artificial or reconstructed lava.

Soapstone or talc chemically is a hydrated silicate of magnesia. When fired it gives up water of hydration and results in a hard, stony mass known as lava in the electrical art. The fired lava articles when discarded for any reason, have heretofore been a total loss. I can utilize either the fired material or waste from the process of machining the natural soapstone, which heretofore has been extremely large, but prefer to use in my new composition at least some unfired talc. The powdered magnesium silicate whether fired or unfired or a mixture of both is thoroughly mixed with a gelatinous, or colloidal, binder of magnesium silicate, as much of the colloidal binder being added as is necessary to make the mixture easily moldable and to thoroughly fill all the spaces between the talc particles. The binder may be prepared by precipitating a solution of magnesium salt, such as the sulfate of magnesium, with a soluble silicate, such as sodium silicate. The flocculent, gelatinous precipitate is conveniently separated by means of a centrifugal separator from the solution and carefully washed free from soluble salts, for example in the case given, free from sodium sulfate. The gelatinous precipitate has a large and varying percentage of water of hydration and, therefore, exact proportions cannot be given.

The mixture may be molded in the usual way, or it may be squirted in the form of rods or tubes and after drying machined in a lathe or otherwise much like a piece of native talc. After being shaped into desired form and thoroughly dried the articles are fired in the same manner as articles formed from native talc are fired, as in an ordinary porcelain kiln at a temperature of 1000°–1300° C. or even higher.

Articles made according to this process are cheaper than when made from natural lava and when operated in heating devices, in places where they are exposed to arcs, or, under other trying conditions have a life equal to the best grade of natural lava. In a similar manner I can make articles consisting of a filler of powdered alumina and a binder of gelatinous aluminum hydroxid. The latter compound can be precipitated in the usual way by adding an alkaline hydroxid or carbonate to a solution of an aluminum compound. Similarly, a filler of silica may be molded with a binder of gelatinous silica, precipitated by adding an acid to a soluble silicate, such as sodium silicate. Centrifugal separation can be conveniently used in each case. These materials are molded, dried and fired as already described.

What I claim as new and desire to secure by Letters Patent of the United States, is,

1. The process which consists in mixing powdered talc with gelatinous magnesium silicate, molding the mixture under pressure and firing at an elevated temperature.

2. The process which consists in mixing powdered talc with a gelatinous magnesium silicate, molding the mixture under pressure and firing at a temperature at or about 1000° C.

3. A machineable, molded artificial lava consisting of mineral talc and a binder of precipitated gelatinous magnesium silicate, and convertible by firing to a material having the heat resisting properties of natural lava.

In witness whereof, I have hereunto set my hand this 27th day of July, 1911.

CHARLES P. STEINMETZ.

Witnesses:
 BENJAMIN B. HULL,
 HELEN ORFORD.